Dec. 23, 1958     W. HENNING     2,865,077
FASTENING-CLAMP
Filed Dec. 21, 1953
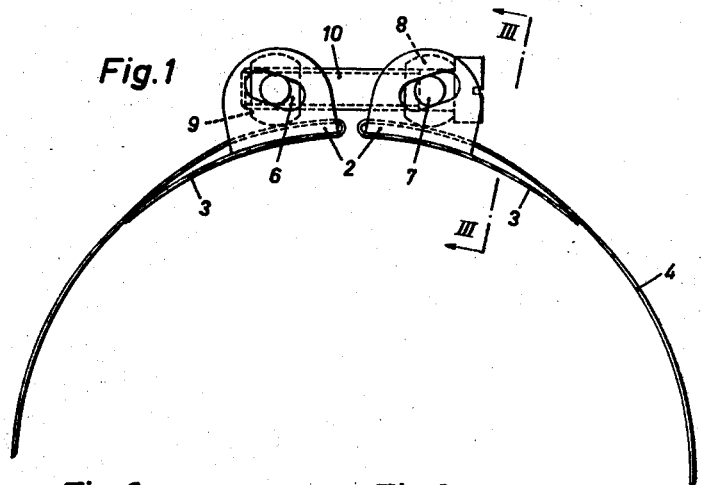
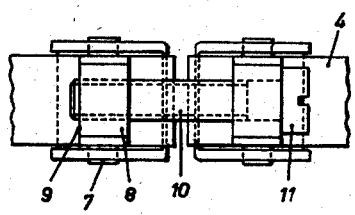
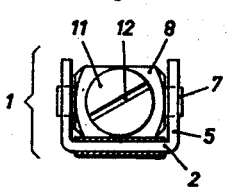
Inventor
Wolfgang Henning

United States Patent Office 2,865,077
Patented Dec. 23, 1958

2,865,077

FASTENING-CLAMP

Wolfgang Henning, Nieder-Marsberg,
Westphalia, Germany

Application December 21, 1953, Serial No. 399,313

Claims priority, application Germany February 24, 1953

5 Claims. (Cl. 24—280)

A variety of fastening-clamps for hoses or other hollow bodies which are to be sealed have become known. In these known devices the clamping-sleeve was attached by its end to each of the holding-shoes of the clamp. The clamping-sleeve was fastened tight by means of these holding shoes with the aid of an adjusting screw. In this type of construction, the adjusting screw had to be introduced through a perforation; a similar perforation was provided in the clamping sleeve itself, as a result of which the disadvantage arose that the clamping sleeve was weakened exactly at the point that was most subject to strain.

A further disadvantage, which is of very special importance, in the case of the known device was that the exact length of the clamping-sleeve had to be determined in advance, when manufacturing it, so that it would fit the job in question. But since this desired length was only very seldom known in advance, it became necessary to manufacture clamping-sleeves in numerous lengths and to keep them in stock, so that the required length could be selected in each particular case.

Furthermore, fastening-clamps have become known, in which each end of the clamping-sleeve is twisted around the holding shoes, and the holding shoe is then tightened by means of a screw. This holding-screw penetrates into either a projecting part of this holding-shoe or else into special joining parts especially added to the holding-shoe. But these fastening-clamps were also unable to meet the heightened demand for a fastening device that would be permanent and secure. The danger existed that in the course of time the end which was twisted around the holding-shoe would slip out due to loosening. This danger is particularly great when the twisted end is not pressed with sufficiently great friction closure from the pressure exerted by the fastening-clamp. Finally, this well-known type of fastening could not be employed in cases where the twisted end of the fastening sleeve was not pressed firmly onto a supporting base by the fastening clamp. It therefore became necessary either to return to the traditional type of fastening, i. e. by perforating the fastening sleeve, or to the device of firmly joining the fastening sleeve, after it had been twisted around the holding-shoe to the remaining portion of the fastening-sleeve or to the holding-shoe, by some suitable means or other, such as welding, soldering or riveting.

In accordance with the invention, all of these disadvantages are avoided by virtue of the fact that the holding shoes and the joining links arranged as part of it, into which the adjusting screw penetrates, are so shaped and arranged in such an adjustable relation to each other, that when being tightened by the adjusting screw the joining links exert such a wedge-like pressure on the ends of the fastening sleeve in the vicinity of the point where it is bent or twisted around the holding-shoes, that an increased security against undesirable removal of the ends of the fastening sleeves is guaranteed.

In a particular form of the idea of the invention the joining links are shaped as belt-tighteners, which, by means of pins, which penetrate in such an oblique fashion into deep holes cut into the sides of the holding-shoes, that when the adjusting-screw is tightened, the belt-tighteners are pressed towards the center of the object to be joined and thus lightly to the ends of the fastening-sleeve. It is desirable to attach the belt tighteners in planes which are perpendicular to the holes which serve to hold the adjusting-screw.

The invention has the advantage that no perforation need be provided in the fastening-sleeve, but rather that it can be supplied by the yard and can be cut according to the desired length of sleeve on the spot where it is to be mounted. In this way, universal use is possible. Mounting is made easier, inasmuch as in cases where the object to be joined is also to be joined at the same time with another part of the structure, and where it is sometimes necessary to introduce the fastening-sleeve through narrow openings, the fastening-sleeve is at first laid around the object and introduced through the opening and only then are the ends of the fastening-sleeve connected to the two fastening-shoes by bending. This manner of mounting was not possible in the devices known up till now, where the fastening-sleeve was tightly joined to the holding-shoes. Nor is it possible in such cases to introduce the fastening-sleeve together with the holding-shoes through these narrow openings.

If relatively strong fastening material is used for the fastening-sleeve, the construction described up to this point is adequate, with the use of round holes in the shoes for mounting the belt-tighteners, to guarantee a sufficient fastening of the fastening-sleeve, particularly when the ends of the fastening-sleeves which are bent over are long enough, so that a pressure is exterted from the upper sleeve onto the part of the sleeve lying below it.

For particularly secure fastening and in cases where a fastening-sleeve of relatively weak material is to be used, it is useful to mount the tighteners in obliquely-placed elongated slots in the holding-shoes. These elongated slots are here arranged in such an oblique relationship to each other, that the lower parts of the elongated slots lie on the sides of the holding-shoes facing each other. In this way the result is achieved that when the adjusting-screw is tightened, the belt-tighteners are pressed towards the center and tightly onto the ends of the fastening-sleeve, so that in the case of relatively thin fastening-sleeve material the danger is eliminated of the sleeve being pulled out of the holding shoes.

The manner of operation of this type of construction is as follows: after the two ends of the fastening-sleeve have been wound around the lower shoulders of the holding-shoes, the adjusting-screw, on which the one belt-tightener has been moved up till it hits the screw-head, is at first introduced through the slit of the one holding-shoe, till the belt-tightener lies in the inner angle-space of the holding-shoe. Then the other belt-tightener is inserted into the angle-space of the other holding-shoe and the adjusting-screw is screwed into the threaded hole of this holding-shoe. When the adjusting-screw is tightened, the lower parts of the two belt-tighteners press firmly against the fastening-sleeve, in a very advantageous way near the bent-over spot of the fastening-sleeve. Thus a particularly secure tightening of the fastening-sleeve is achieved, because the bend of the fastening-sleeve is sharpest at this very point. A high degree of holding is of particularly great significance, in order to avoid undesired extraction of the fastening-sleeve.

The construction of the invention and further details of the idea of the invention can be more clearly gathered on the basis of the illustration. It shows:

Fig. 1, a side view of the fastening-sleeve with the holding-shoes, the belt-tighteners and the adjusting-screws, Fig. 2, a partial view in place of the fastening-clamp Fig. 3, a cross-section through a holding-shoe along the line III—III of Fig. 1.

According to the construction type of Figs. 1 to 3, the holding-shoes 1 of the fastening clamp have a U-form (Fig. 3). Around the base wall portion 2 of the holding shoes the both ends 3 of the fastening-sleeve 4 are so wound that the open ends lie below. In the sides 5 of the holding-shoes 1 elongated slots 6 are provided. Into these elongated slots fit the pins 7 of each belt-tightener 8. The belt-tighteners 8 are flattened at the sides 9. There are holes bored at the flat places. In one of these holes there is a thread, whereas the other hole is without a thread and with a correspondingly larger diameter, so that an adjusting-screw 10 can be led through this bigger hole and screwed into the thread of the other belt-tightener. The adjusting-screw 10 lies with its head 11 against the belt-tightener that has the larger hole. The head has a driving-slot 12, as shown in Fig. 3.

After the fastening-sleeve has been wound along the object to be fastened the holding-shoes are pulled together by means of the adjusting-screw 10. In the course of this, by turning, the belt-tighteners constantly automatically adjust their position to the changed angle of tension, so that a parallel tension is afforded. On account of the elongated slots the belt-tighteners, by means of their curved surfaces, are firmly pressed onto the fastening-sleeve lying below them, so that the latter, even in the event that the bend is not sufficient to prevent winding, is held fast because of this clamping effect. In a special type of construction not shown in the drawing, the belt-tighteners can be shaped with square edges instead of being provided with the two curved surfaces.

What is claimed is:

1. A clamping device comprising, in combination, first and second substantially U-shaped support means, each having a continuous base wall portion and opposite side wall portions, said continuous base wall portions being adapted to be encompassed, respectively, by the free ends of a clamping band surrounding a tubular member; first and second tightening members arranged between said side wall portions of said first and second support means, respectively; first and second mounting means for mounting said first and second tightening members on said side wall portions of said first and second support means, respectively, for pivotal movement relative thereto and also for sliding movement relative thereto toward and away from each respective continuous base wall portion along a path extending in a direction inclined thereto so that upon movement of each tightening member toward the continuous base wall portion of the respective support means the clamping band lying upon the inner face of such continuous base wall portion will be wedged thereagainst, said first and second support means being in alignment with each other and arranged opposite each other in such a manner that the regions of said first and second support means wherein said respective paths are nearer to said respective continuous base wall portions than in the regions wherein said respective paths are spaced further from said respective continuous base wall portions are closer to each other than the last-mentioned regions; and tightening means connected to said first and second tightening members for moving the same toward each other whereby the clamping band surrounding the tubular member and having its free ends lying upon the inner faces of said continuous base wall portions of said first and second support means, respectively, will be wedged thereagainst and be tightened about the tubular member or the like during tightening of said tightening means.

2. A clamping device comprising, in combination, first and second substantially U-shaped support means, each having a continuous base wall portion and opposite side wall portions, said continuous base wall portions being adapted to be encompassed, respectively by the free ends of a clamping band surrounding a tubular member and said side wall portions being formed with similar opposite elongated slots therethrough extending in a direction inclined to said continuous base wall portion, said first and second support means being in alignment with each other and arranged opposite each other in such a manner that the regions of said first and second support means wherein said respective slots are nearer to said respective continuous base wall portions than in the regions wherein said respective slots are spaced further from said respective continuous base wall portions are closer to each other than the last-mentioned regions; first and second tightening members arranged between said side wall portions of said first and second support means, respectively, each of said tightening members having opposite stud portions extending into said opposite slots of said side wall portions, respectively, so that each of said tightening members is pivotally movable relative to each respective support means and slidably movable relative thereto along a path coextensive with said slots so that upon movement of each tightening member toward the continuous base wall portion of the respective support means the clamping band lying upon the inner face of such continuous base wall portion will be wedged thereagainst; and tightening means connected to said first and second tightening members for moving the same towards each other whereby the clamping band surrounding the tubular member and having its free ends lying upon the inner faces of said continuous base wall portions of said first and second support means, respectively, will be wedged thereagainst and be tightened about the tubular member during tightening of said tightening means.

3. A clamping device comprising, in combination, first and second substantially U-shaped support means, each having a substantially planar continuous base wall portion and opposite side wall portions, said continuous base wall portions being adapted to be encompassed, respectively, by the free ends of a clamping band surrounding a tubular member; first and second tightening members arranged between said side wall portions of said first and second support means, respectively; first and second mounting means for mounting said first and second tightening members on said side wall portions of said first and second support means, respectively, for pivotal movement relative thereto and also for sliding movement relative thereto toward and away from each respective continuous base wall portion along a path extending in a direction inclined to the plane thereof so that upon movement of each tightening member toward the continuous base wall portion of the respective support means the clamping band lying upon the inner face of such continuous base wall portion will be wedged thereagainst, said first and second support means being in alignment with each other and arranged opposite each other in such a manner that the regions of said first and second support means wherein said respective paths are nearer to said respective continuous base wall portions than in the regions wherein said respective paths are spaced further from said respective continuous base wall portions are closer to each other than the last-mentioned regions; and tightening means connected to said first and second tightening members for moving the same toward each other whereby the clamping band surrounding the tubular member and having its free ends lying upon the inner faces of said continuous base wall portions of said first and second support means, respectively, will be wedged thereagainst and be tightened about the tubular member during tightening of said tightening means.

4. A clamping device comprising, in combination, first and second substantially U-shaped support means, each having a substantially planar continuous base wall portion and opposite side wall portions, said continuous base wall portions being adapted to be encompassed, respectively, by the free ends of a clamping band surrounding tubular member and said side wall portions being formed with similar opposite elongated slots therethrough extending in a direction inclined to the plane of said continuous base wall portion, said first and second support means being in alignment with each other and arranged opposite each other in such a manner that the regions of said first and second support means wherein said respective slots are nearer to said respective continuous base wall portions than in the regions wherein said respective slots are spaced further from said respective continuous base wall portions are closer to each other than the last-mentioned regions; first and second tightening members arranged between said side wall portions of said first and second support means, respectively, each of said tightening members having opposite stud portions extending into said opposite slots of said side wall portions, respectively, so that each of said tightening members is pivotally movable relative to each respective support means and slidably movable relative thereto along a path coextensive with said slots so that upon movement of each tightening member toward the continuous base wall portion of the respective support means the clamping band lying upon the inner face of such continuous base wall portion will be wedged thereagainst; and tightening means connected to said first and second tightening members for moving the same towards each other whereby the clamping band surrounding the tubular member and having its free ends lying upon the inner faces of said continuous base wall portions of said first and second support means, respectively, will be wedged thereagainst and be tightened about the tubular member during tightening of said tightening means.

5. A clamping device comprising, in combination, first and second substantially U-shaped support means, each having a substantially planar continuous base wall portion and opposite side wall portions, said continuous base wall portions being adapted to be encompassed, respectively, by the free ends of a clamping band surrounding a tubular member and said side wall portions being formed with similar opposite elongated slots therethrough extending in a direction inclined to the plane of said continuous base wall portion, said first and second support means being in alignment with each other and arranged opposite each other in such a manner that said continuous base wall portions of said first and second support means are substantially coplanar and the regions of said first and second support means wherein said respective slots are nearer to said respective continuous base wall portions than in the regions wherein said respective slots are spaced further from said respective continuous base wall portions are closer to each other than the last-mentioned regions; first and second tightening members arranged between said side wall portions of said first and second support means, respectively, each of said tightening members having opposite stud portions extending into said opposite slots of said side wall portions, respectively, so that each of said tightening members is pivotally movable relative to each respective support means and slidably movable relative thereto along a path coextensive with said slots so that upon movement of each tightening member toward the continuous base wall portion of the respective support means the clamping band lying upon the inner face of such continuous base wall portion will be wedged thereagainst; and tightening means connected to said first and second tightening members for moving the same towards each other whereby the clamping band surrounding the tubular member and having its free ends lying upon the inner faces of said continuous base wall portions of said first and second support means, respetcively, will be wedged thereagainst and be tightened about the tubular member during tightening of said tightening means.

References Cited in the file of this patent

UNITED STATES PATENTS

| | | |
|---|---|---|
| 679,139 | Brett | July 23, 1901 |
| 2,073,294 | Caillau | Mar. 9, 1937 |
| 2,331,132 | Nadelson | Oct. 5, 1943 |
| 2,409,128 | Krasberg | Oct. 8, 1946 |
| 2,727,292 | Houghton | Dec. 20, 1955 |

FOREIGN PATENTS

| | | |
|---|---|---|
| 754,564 | France | Aug. 28, 1933 |